No. 679,932. Patented Aug. 6, 1901.
P. ABRAHAMSON.
VENTILATOR.
(Application filed Oct. 9, 1900.)
(No Model.)
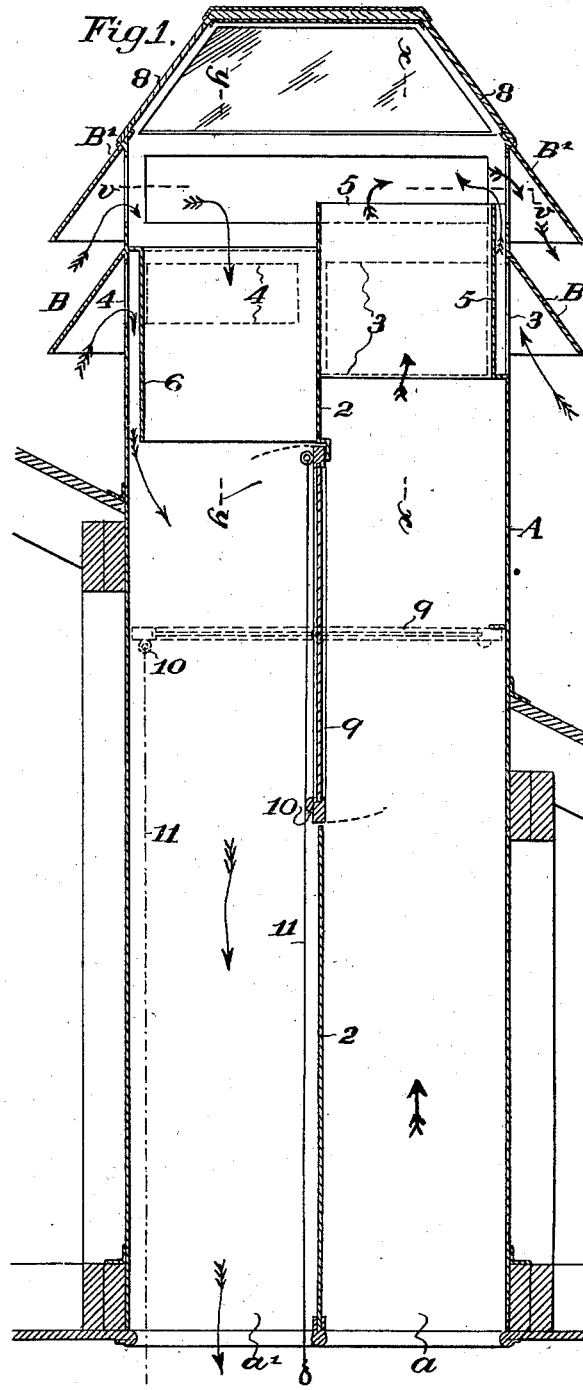
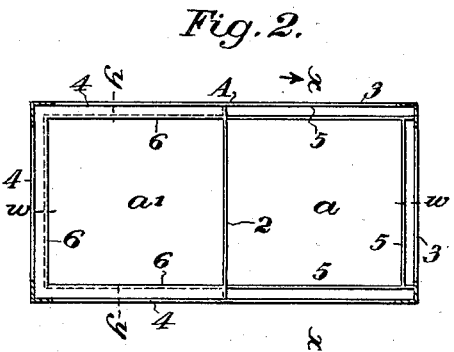
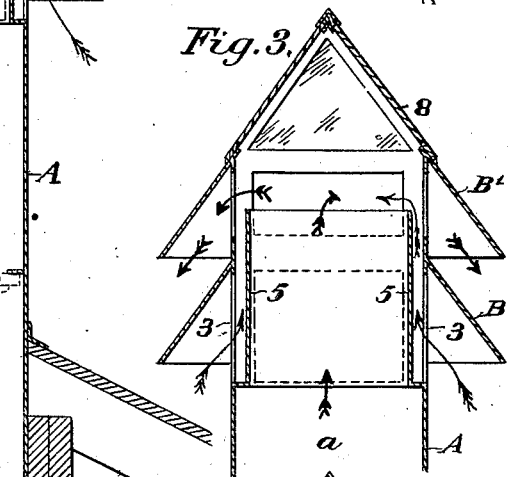
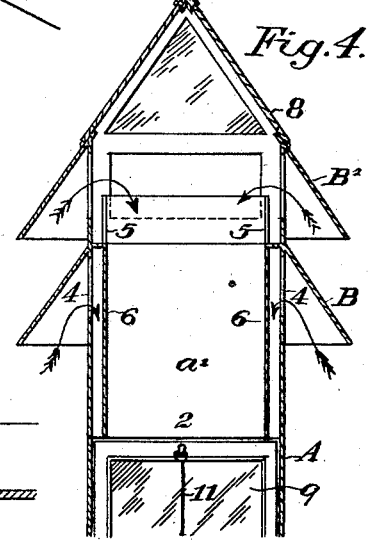
Witnesses,
Inventor,
Peter Abrahamson

UNITED STATES PATENT OFFICE.

PETER ABRAHAMSON, OF SAN FRANCISCO, CALIFORNIA.

VENTILATOR.

SPECIFICATION forming part of Letters Patent No. 679,932, dated August 6, 1901.

Application filed October 9, 1900. Serial No. 32,487. (No model.)

*To all whom it may concern:*

Be it known that I, PETER ABRAHAMSON, a citizen of the United States, residing in the city and county of San Francisco, State of California, have invented an Improvement in Ventilators; and I hereby declare the following to be a full, clear, and exact description of the same.

My invention relates to improvements in ventilating devices of the class having inlet and outlet passages for fresh and vitiated air.

It consists of a ventilator-box or air-shaft divided by a longitudinal vertical partition into ingress and egress air-passages, means for deflecting the air respectively downwardly and upwardly in these passages, a damper either forming a part or continuation of the said partition or turnable therein to cut off the circulation, and of details more fully to be set forth in the drawings and specification.

Figure 1 is a vertical section on the line $w$ $w$, Fig. 2, of my improved ventilator. Fig. 2 is a horizontal section on the line $v$ $v$, Fig. 1. Fig. 3 is a vertical section on the line $x$ $x$ of Fig. 2. Fig. 4 is a vertical section on the line $y$ $y$ of Fig. 2.

A represents a vertical ventilator box or casing divided by a vertical partition 2 into the flues $a$ and $a'$, which may be of any desired shape. In the present illustration they are square in section. Near the upper outer ends the walls of these flues are cut away on the exterior sides, so as to form openings 3 and 4. Within these flues are fitted supplemental walls 5 and 6, so supported as to leave annular surrounding channels between the inner and outer walls, with which the openings 3 and 4 communicate. The openings 3 are preferably of greater area than 4. The inner wall 5 is connected with the outer wall at the bottom and below the opening 3, and the annular space is thus closed at the bottom and is open at the top. The wall 6 is similarly connected at the top of the opening 4, and the annular channel on this side is open downwardly, thus leaving an ingress-passage through the spaces between the lower edge of 4 and the inner wall 6. The flues $a$ and $a'$ are otherwise open at the ends.

B is a hood fitting upon A and divergent downwardly and outwardly from A and above the openings 3 and 4, so that wind blowing toward the structure will be converged by the hood into the openings 3 and 4. This will produce an upward air-current through the opening 3 and the annular channel interior thereto and a downward current through the opening 4 and the annular channel on that side. By reason of these channels being closed, one at the top and the other at the bottom, these currents will act within the flues or passages $a$ and $a'$ to produce reverse currents, foul air rising and escaping from one and fresh air entering and passing downward through the other. The inner rim of the hood B fits snugly around the upper end of the flue-shaft A for the purpose of inducing these currents. The open upper ends of the flues $a$ $a'$ are protected by a second hood B', supported upon posts or standards, to allow free passage of air into and out of the flues $a$ $a'$. Its top is made translucent, as by skylights 8, which while protecting the flues from rain and the like will admit light to spaces in line beneath the flues.

A centrally-pivoted swinging gate 9 is interposed in A as convenience suggests, but generally near the top. This gate ordinarily forms part or a continuation of the partition 2. This partition is cut away a distance equal to the length of the gate. The damper or gate 9 is pivoted centrally in this opening, so that it may ordinarily stand in a line with the partition and be practically a part thereof. It is weighted at one end, as 10. This gate may be made of glass contained within a metal sash. When it is desired to close the passages $a$ and $a'$, the gate is operated by a cord 11 or other suitable device.

As these ventilators are often quite large, it is possible to admit considerable light through them, as where they penetrate to a basement or some dark chamber. It is to this end that I have made the roof of the hood B and the damper of glass, that the light may not be shut off even when the damper 9 is closed.

In operation the wind striking beneath the hood B and upon the walls 5 is deflected upwardly. The projection of 5 above $a$ and into the hood B' causes a strong suction in the flue $a$, and the hot or foul air is drawn up from the chamber below. The wind striking the plate 6 is deflected downwardly into $a'$, and strong currents of cold air are induced therein to take the place of the warm air removed through $a$. By the arrangement of the walls 5 and 6, and the consequent lengthening of the flue $a$ and the shortening of the flue $a'$, a draft is caused that greatly increases the rush of ingoing and outgoing currents and makes ventilation more rapid and efficacious.

Having thus described my invention, what I claim as new, and desire to secure by Letters Patent, is—

1. A ventilator consisting of an air-shaft divided by a vertical partition into separate open-ended passages for the ingress and egress of air, said shaft having openings in the exterior walls and near the outer end of each of these passages, and means forming channels in the shaft cut off from one portion of each passage and in open communication with another portion of the same passage whereby the outer air is deflected downwardly in the ingress-passage and upwardly about the egress-passage to cause an outdraft in the latter.

2. A ventilator consisting of an air-shaft divided by a vertical partition into ingress and egress air-passages, openings in the exterior walls near the upper end of each of these passages, an inner wall within each of these passages and opposite the aforesaid openings to form annular channels, the channel around the ingress-passage being closed at the top and open at the bottom, and the channel around the egress-passage, closed at the bottom and open at the top, and means directing air-currents into said channels.

3. The combination in a ventilator of vertical contiguous flues with openings around the top to the exterior air, trunks or casings of smaller diameters fixed within the flues opposite to the openings and forming channels between the outer and inner walls, one of said channels being closed around the bottom, and extending above its external openings, and the other closed at the top and extending below its external openings, and a hood by which air-currents are directed into the openings and channels.

4. The combination in a ventilator of vertical contiguous flues, with openings around the top to the exterior air, trunks or casings of smaller diameter fixed within the flues opposite to the openings and forming channels between the outer and inner walls, one of which channels is closed at the bottom, and the other at the top whereby exterior air-currents are directed through the openings and into the channels to produce upward and downward currents in the respective flues, and a gate or damper pivoted in the plane of the separating-partition, and turnable to stand in the plane of the partition or transversely to close both flues.

5. A ventilator consisting of an air-shaft having a hood or covering, a vertical partition dividing said shaft into an air-ingress flue, and an air-egress flue, openings in the exterior walls and near the upper ends of the flues, inner casings or trunks opposite these openings forming annular channels within the flues, one of which is closed below and the other above the openings, a second hood located below the first-named hood with interspaces connecting the flues with the outer air, said second hood fitting closely around the top of the flue or air-shaft.

6. The combination in a ventilator of vertical flues connecting the space to be ventilated with the open air and having a separating-partition common to both, openings around the upper ends of the flues to the outer air, and means directing air-currents into said openings, trunks or casings of smaller diameter fixed in the flues opposite the openings and forming annular channels, one of which is closed at the bottom and the other at the top whereby opposite currents are produced within the flues, a gate or damper pivoted in the plane of the intermediate partition and turnable to form a continuation thereof, or to close both flues, said gate being made transparent, and a transparent closed hood or roof above the flues whereby the latter act also as light-wells.

7. A ventilator including an air-shaft divided by a vertical partition into ingress and egress air-passages, with openings to the exterior air, trunks or casings of smaller diameters fixed within the flues opposite to the said openings and forming channels, cut off from one portion of each passage and in open communication with another portion of the same passage, means for admitting light from above and means for controlling the air-currents without cutting off the light.

8. A ventilator consisting of vertical contiguous flues, horizontal openings into the upper ends of said flues, trunks fixed within the flues opposite the openings and forming annular channels with which the openings connect, one of said channels being closed at the bottom, and extending above the upper edges of the openings, and the other closed at the top and extending below the lower edges of its openings and means directing air-currents into said channels.

In witness whereof I have hereunto set my hand.

PETER ABRAHAMSON.

Witnesses:
S. H. NOURSE,
CHAS. E. TOWNSEND.